(12) United States Patent
Codeluppi et al.

(10) Patent No.: US 8,869,405 B2
(45) Date of Patent: Oct. 28, 2014

(54) EDGE-TRIMMER

(75) Inventors: Lelio Codeluppi, Cadelbosco di Sopra (IT); Giorgio Becchi, Cadelbosco di Sopra (IT); Silvano Becchi, Cadelbosco di Sopra (IT)

(73) Assignee: Paem S.N.C. Becchi Silvano E C., Cadelbosco Di Sopra (IT)

( * ) Notice: Subject to any disclaimer, the term of this patent is extended or adjusted under 35 U.S.C. 154(b) by 270 days.

(21) Appl. No.: 13/395,468

(22) PCT Filed: Sep. 14, 2010

(86) PCT No.: PCT/IB2010/054133
§ 371 (c)(1),
(2), (4) Date: Mar. 12, 2012

(87) PCT Pub. No.: WO2011/033448
PCT Pub. Date: Mar. 24, 2011

(65) Prior Publication Data
US 2012/0167399 A1  Jul. 5, 2012

(30) Foreign Application Priority Data

Sep. 16, 2009  (IT) .............................. MO2009A0227

(51) Int. Cl.
*B26B 27/00* (2006.01)
*A01D 34/90* (2006.01)
(52) U.S. Cl.
CPC ...................................... *A01D 34/90* (2013.01)
USPC .................................. 30/276; 30/347; 56/16.7
(58) Field of Classification Search
CPC ..... A01D 34/416; A01D 34/90; A01D 34/84; A01D 34/4163; B26B 25/002
USPC ................ 30/276, 347, 286, 320; 172/14, 17; 56/16.7, 12.7, 16.9, 17.1, 17.5
See application file for complete search history.

(56) References Cited

U.S. PATENT DOCUMENTS

| | | | | |
|---|---|---|---|---|
| 3,221,481 A * | 12/1965 | Mattson et al. | ................. | 56/16.9 |
| 5,603,205 A * | 2/1997 | Foster | ............................. | 56/16.7 |
| 5,662,428 A * | 9/1997 | Wilson | ........................ | 403/374.5 |
| 5,771,670 A * | 6/1998 | Perry | ............................. | 56/12.1 |
| 6,260,278 B1 | 7/2001 | Faher | | |
| 6,439,088 B1 * | 8/2002 | Eytchison et al. | ................ | 83/13 |

(Continued)

FOREIGN PATENT DOCUMENTS

WO  2005/009110 A1  2/2005
WO  2009/153752 A1  12/2009

*Primary Examiner* — Omar Flores Sanchez
(74) *Attorney, Agent, or Firm* — Pearne & Gordon LLP (57) ABSTRACT

An edge-trimmer comprises a holdable support arm (2), a cutting head (3) rotatable about a rotation axis thereof (C) and positioned in proximity of an end (2b) of the support arm (2); a motor for moving the cutting head (3) by means of a transmission organ (5), an orientation device (6) of the cutting head (3) in the space connected to the support arm (2) and rotatable about a first rotation axis (A). The orientation device (6) exhibits a rotatable junction (7) which enables the cutting head (3) to further rotate about a second rotation axis (B) which is inclined with respect to the first rotation axis (A).

10 Claims, 5 Drawing Sheets

(56) References Cited

U.S. PATENT DOCUMENTS

| | | |
|---|---|---|
| 6,516,598 B1 | 2/2003 | Notaras et al. |
| 6,651,347 B2 * | 11/2003 | Uhl ................................. 30/383 |
| 7,584,542 B2 * | 9/2009 | Smith ............................. 30/276 |
| 7,627,952 B2 * | 12/2009 | Richards ......................... 30/276 |
| 7,739,800 B2 * | 6/2010 | Hurley et al. ................... 30/276 |
| 8,250,766 B2 * | 8/2012 | Levsen ............................ 30/276 |
| 8,544,247 B2 * | 10/2013 | Cathcart ........................ 56/12.7 |
| 2001/0034940 A1 * | 11/2001 | Marshall et al. ................ 30/276 |

* cited by examiner

EDGE-TRIMMER

TECHNICAL FIELD

The invention relates to an edge-trimmer. More precisely, the present invention relates to an edge-trimmer of a type which can be gripped, motorised and completely supported by an operator.

The present invention is particularly applicable to the field of gardening, for cutting and trimming of lawns, brush and shrubs.

BACKGROUND ART

Known-type edge-trimmers comprise a support arm arranged along a prevalently-developing longitudinal axis.

A cutting head rotating on a rotation plane thereof is usually associated to a lower portion of the support arm.

The cutting head generally comprises a rotating drum and a cutting tool.

The cutting tool in known-type edge-trimmers are provided with a rotary blade or a reel of wire, usually made of nylon or the like, in both cases supported and set in rotation by the rotary drum.

In order to rotate the cutting head a motor is used which can either be electrical or internal-combustion.

The motor is generally positioned in proximity of an upper portion of the support arm in order to realise a balancing of the masses and facilitate handling of the trimmer.

To transmit torque to the cutting head, an appropriate transmission device is used, which can function either by wires or mechanical joints.

With the aim of safeguarding the operator, the cutting head is partially covered by a covering guard.

The guard is connected to the support arm and interposed between the operator and the cutting portion facing it, in order to prevent the cutting tool, during use of the trimmer, from striking extraneous bodies, such as for example twigs, stones or other detritus, and sending the said bodies flying towards the legs of the operator.

In order to enable manual use of the trimmer, models of known type exhibit a handle bar connected to the support arm.

The handlebar can comprise one or two gripping arms, according to the weight of the device.

Further, trimmers often exhibit an additional strap such as to make transport and traversing of the tool less laborious, especially if used for long periods.

Trimmers described herein above exhibit various drawbacks, especially relating to the difficulty of using them during cutting on non-horizontal planes.

The conformation of known-type edge-trimmers comprises a single rotation plane of the cutting head due to the presence of a rigid elbow-joint between the motor and the cutting head, and this makes cutting on non-horizontal planes problematic.

In particular, when the cutting surface is descending the operator has to handle the trimmer in a way which is unnatural and very laborious in order to maintain the rotating plane of the cutting head parallel to the cutting surface.

More precisely, the elongate structure of the trimmer and the sharing-out of the weights on the ends make the use of the device awkward in a different position thereof from the normal use position.

When the surface to be cut is vertical or oblique, the operator has to turn the trimmer, modifying the wielding position, and this can be problematic especially for professional edge-trimmers (provided with an internal combustion engine) due to the weight thereof and inasmuch as excessive rotation can cause exit of the fuel.

In this context, the technical task underpinning the present invention is to provide a trimmer which obviates the above-cited drawbacks of the prior art.

In particular, an aim of the present invention is to provide an edge-trimmer which is easy to manoeuvre in all use conditions.

The set technical objective and the set aim are substantially attained by an edge-trimmer comprising the technical characteristics set out in one or more of the appended claims.

DISCLOSURE OF INVENTION

Further characteristics and advantages of the present invention will more clearly emerge from the non-limiting description of a preferred but not exclusive embodiment of an edge-trimmer, as illustrated in the accompanying figures of the drawings, in which.

With reference to the accompanying figures of the drawings, 1 denotes in its entirety an edge-trimmer in accordance with the present invention.

The edge-trimmer 1 comprises a support arm 2 which extends along a prevalent development axis D from a first end 2a to a second end 2b.

A motor 4, which can be internal combustion or electric according to use applications, is connected to the support arm 2.

In particular, the internal-combustion motor 4 is connected to the support arm 2 at the first end 2a.

The motor 4 is further connected via a transmission organ 5 to a cutting head 3 position in proximity of the second end 2b of the support arm 2.

Figure 3:
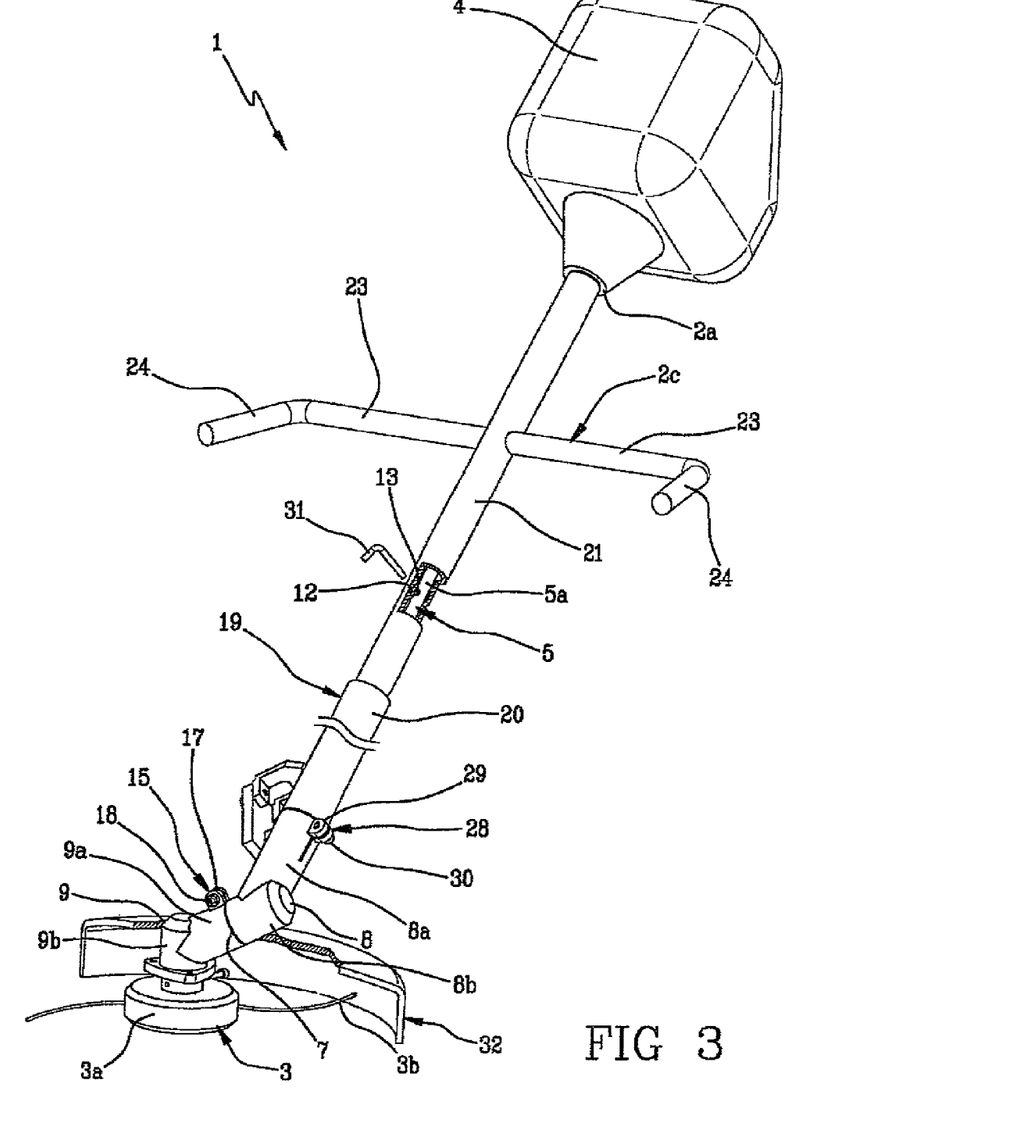
FIG. 3 is a perspective view of the edge-trimmer of FIG. 1 in a third operating configuration thereof.

A covering guard 32 is positioned, partially covering the cutting head, is connected to the support arm 2 in a substantially known way (illustrated only in FIG. 3).

Figure 4:
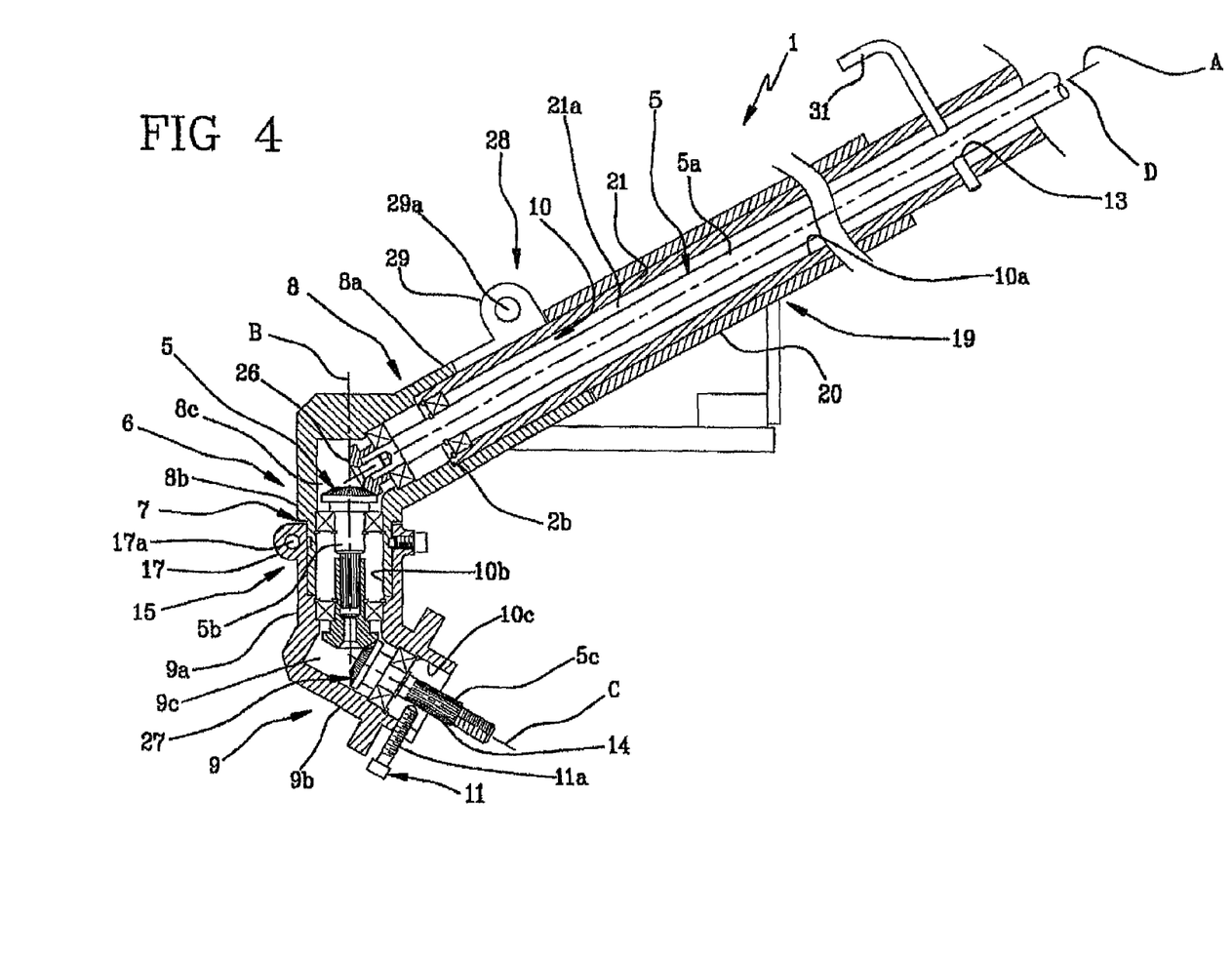
FIG. 4 is a section view of a portion of the edge-trimmer of FIG. 1, with some parts removed.

In particular, as can be seen in FIG. 4, the support arm 2 comprises a tubular body 21 exhibiting a through-cavity 21a, the function of which will be more clearly revealed in the course of the present description.

Figure 1:
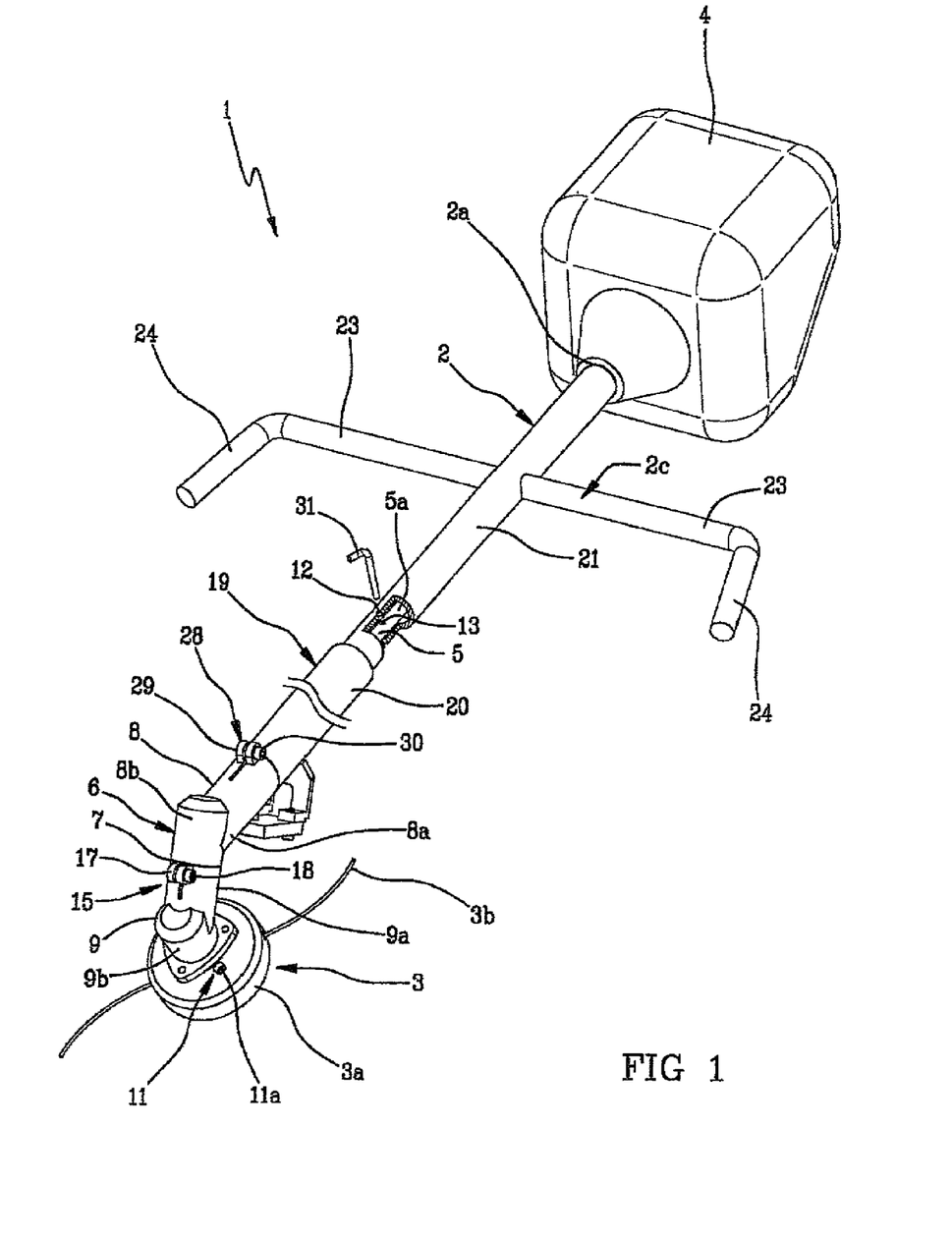
FIG. 1 is a perspective view of an edge-trimmer of the present invention, in a first operating configuration thereof.
Figure 2:
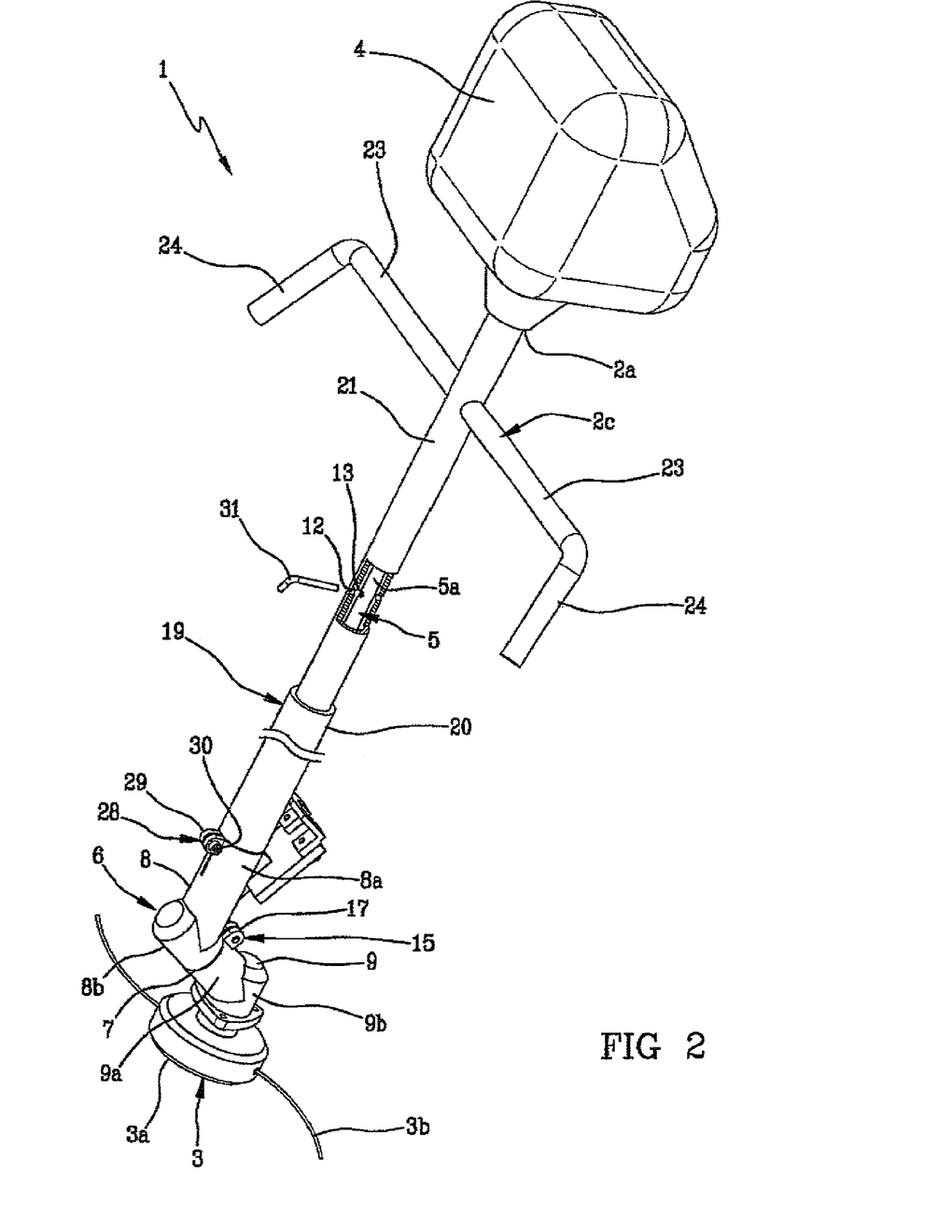
FIG. 2 is a perspective view of the edge-trimmer of FIG. 1, in a second operating configuration thereof.

Note that FIGS. 1, 2 and 3 illustrate a removed portion of the support arm 2 in order to enable a view of the inside of the tubular body 21.

The support arm 2 further exhibits a grip portion 2c for facilitating grip by an operator.

In particular, the grip portion 2c is defined by a handlebar 22 fixed to the tubular body 21 for facilitating an operator in handling the trimmer 1.

The handle 22 comprises a gripping rod 23 fixed to the tubular body 21 which extends in a distancing direction from the prevalent development axis D of the support arm 2.

In the illustrated embodiment, the handlebar 22 comprises two rods 23 arranged in a distancing direction from the prevalent development axis D of the support arm 2 along substantially reciprocally opposite directions.

Both the rods 23 exhibits a free end to which a grip 24 is fixed such as to facilitate gripping by the operator.

Further, command means (not illustrated) of the motor 4 are connected to one or both the grips 24 such as to make control of the cutting speed easy.

By the expression "speed control" is meant control of the rotation velocity of the cutting head 3.

In particular, the cutting head 3 rotates about an axis of rotation C thereof.

More precisely, the cutting head 3 is composed of a rotating drum 3a and a cutting tool 3b fixed to the drum 3a.

The rotating drum 3a enables a rotary movement of the cutting head 3 about the rotation axis C and is connected to the transmission organ 5.

The cutting tool 3b is supported and set in rotation by the rotating drum 3a, and performs the cutting of the grass.

In the illustrated embodiment, the cutting tool 3b is a synthetic wire, at least partially unwound from a reel (not illustrated) internal of the drum 3a.

In other embodiments, not illustrated, the cutting tool 3b can be constituted by a blade or by metal chains.

The edge-trimmer 1 further comprises an orientation device 6 of the cutting head 3 for varying the orientation of the cutting head 3 with respect to the support arm 2. The orientation device 6 of the cutting head 3 is interposed between the support arm 2, at the second end 2b, and the cutting head 3.

More precisely, the orientation device 6 comprises a first body 8, rotatably associated to the support arm 2 at the second end 2b thereof, and a second body 9, rotatably associated to the first body 8 in order to define a rotatable joint 7.

The cutting head 3 is connected to the second body 9.

In still more detail, the first body 8 is rotatable with respect to the support arm 2 about a first rotation axis A and draws the second body 9 in rotation.

The second body 9 is rotatable with respect to the first body 8 about a second rotation axis B defined by the rotatable joint 7.

The first rotation axis A preferably coincides with the prevalent development axis D of the support arm 2.

The second rotation axis B is inclined with respect to the first rotation axis A and is preferably incident to the first rotation axis A.

In other words, the orientation device 6 is thus rotatable about a first rotation axis A and, via the rotatable joint 7, enables the cutting head 3 to rotate also about the second rotation axis B.

In the preferred embodiment, the first body 8 and the second body 9 are each defined by a respective first tubular portion 8a, 9a and a respective second tubular portion 8b, 9b, inclined to one another and unremovably connected to define an elbow.

In other words, the first tubular portion 8a, 9a and the second tubular portion 8b, 9b are fixed to one another such as to define an angle at a common section, preferably comprised between 90° and 150°.

In the illustrated embodiment, the angle is 135°.

More precisely, the first tubular portion 8a of the first body 8 is coaxial and rotatably associated to the support arm 2 in order to rotate about the first rotation axis A.

The first tubular portion 9a of the second body 9 is coaxial and rotatably associated to the second tubular portion 8b of the first body 8 in order to rotate about the second rotation axis B.

Further, both the first tubular portion 8a, 9a and the second tubular portion 8b, 9b of each first body 8 and second body 9 exhibit an internal through-cavity 8c, 9c.

As the support arm 2, the first body 8 and the second body 9 all exhibit an internal through-cavity 21a, 8c, 9c, they are connected to one another such as to internally define a conduit 10.

In particular, the conduit 10 develops in a continuous succession of straight tracts 10a, 10b, 10c. In the illustrated embodiment, the straight tracts 10a, 10b and 10c are three in number.

A first straight tract 10a is defined in succession by the internal cavity 21a of the support arm 2 and the internal cavity 8c of the first body 8 at the first tubular portion 8a.

In particular, the first straight tract 10a is arranged along the first rotation axis A.

In other words, the first straight tract 10a is arranged along the prevalent development axis D of the support arm 2.

A second straight tract 10b is defined in succession by the internal cavity 8c of the first body 8 at the second tubular portion and by the internal cavity 9c of the second body 9 at the first tubular portion 9a.

In particular, the second straight tract 10b is arranged along the second rotation axis B.

A third straight tract 10c is defined by the internal cavity 9c of the second body 9 at the second tubular portion 9b.

The third straight tract 10c is arranged along the rotation axis C of the cutting head 3.

As previously indicated, a transmission organ 5 is comprised, for connecting the motor 4 and the cutting head 3.

In the illustrated embodiment, the transmission organ 5 comprises a plurality of shafts 5a, 5b, 5c, rotatably engaged in succession to one another such as to realise the drive transmission between the motor 4 and the cutting head 3.

In more detail, each shaft 5a, 5b, 5c, is positioned at a rotation axis A, B, C.

In the illustrated embodiment, the shafts 5a, 5b, 5c are three in number.

A first shaft 5a is located at the first rotation axis A.

The first shaft 5a is connected and set in rotation by the motor 4.

A second shaft 5b is arranged along the second rotation axis B and is set in rotation by the first shaft 5a.

A third shaft defines the rotation axis C of the cutting head 3 and is set in rotation by the second shaft 5b.

Further, the third shaft 5c is solidly connectable to the cutting head 3 at a free end thereof.

In more detail, the third shaft 5c is solidly connectable to the rotating drum 3a of the cutting head 3.

Further, the third shaft 5c exhibits a plurality of longitudinal grooves 14 arranged circumferentially, the use of which will be clarified herein below.

In the preferred embodiment, each shaft 5a, 5b, 5c is connected to the following one by means of a conical coupling 26, 27.

More precisely, the edge-trimmer 1 of the present invention comprises two conical pairs 26, 27, which enable rotation both about the first A and the second B rotation axes, and the transmission of rotary drive from the motor 4 to the cutting head 3 about the rotation axis C thereof.

In particular, a first conical pair 26 connects the first shaft 5a and the second shaft 5b.

A second conical pair 27 connects the second shaft 5b with the third shaft 5c.

Further, each shaft 5a, 5b, 5c is housed at a respective straight tract 10a, 10b, 10c of the conduit 10.

In particular, the first shaft 5a is housed in the first straight tract 10a.

The second shaft 5b is positioned in the second straight shaft 10b.

The third shaft 5c is at least in part positioned in the third straight tract 10c.

The edge-trimmer 1 further comprises coupling means 11 acting between the transmission organ 5 and the orientation device 6 in order to make the transmission organ 5 solid in rotation with at least one of the two bodies 8, 9 of the orientation device 6.

The coupling means 11 preferably make the transmission organ 5 and the second body 9 of the orientation device 6 solid to one another.

In other words the coupling means 11 constrain the movement of the transmission organ 5 and the movement of the second body 9 of the orientation device 6 to one another.

The coupling means 11 are selectively activatable such that the operator can use them when desiring to change the orientation of the cutting head 3.

More precisely, the coupling means 11 comprise a blocking element 11a for rotationally coupling the transmission organ 5 with respect to the second body 9.

In more detail, the blocking element 11a is a coupling plug between the second body 9 and the third shaft 5c.

In still more detail, the blocking element 11a engages the second tubular portion 9b of the second body 9 with the third shaft 5c.

In detail, the blocking element 11a is engaged with one of the longitudinal grooves 14 of the third shaft 5c.

This advantageously enables blocking the rotation of the third shaft 5c about the rotation axis C of the cutting head 3, maintaining the movement of the second body 9 solid with the movement of the third shaft 5c.

More precisely, blocking the rotation of the third shaft 5c about the rotation axis C of the cutting head 3 makes the movement of the second shaft 5b solid with the movement of the third shaft 5c, enabling rotation of the cutting head 3 about the second rotation axis B.

The edge-trimmer advantageously further comprises a blocking body 31 for making the transmission organ 5 solid in rotation with the support arm 2.

In particular, the blocking body 31 is a coupling pin located between the tubular body 21 and the first shaft 5a.

The first shaft 5a exhibits a lateral opening 13.

The tubular body 21 exhibits a lateral hole 12 arranged in such a position as to be aligned to the lateral opening 13 of the first shaft 5a at least at a predetermined angular positioning of the first shaft 5a.

In other words, the lateral opening 13 of the first shaft 5a is located at the lateral hole 12 of the tubular body 21.

This advantageously enables insertion of the blocking body 31 internally of the lateral opening 13 and the lateral hole 12 in order to block relative rotation between the first shaft 5a and the support arm 2.

In use, when the orientation of the head has to be modified the operator turns off the motor 4 and activates the coupling means 11, engaging the blocking element 11a with one of the grooves 14 of the third shaft 5c, and inserts the blocking body 31 internally of the lateral hole 12 and the lateral opening 13.

In this way, when the operator imposes a relative rotation between the first body 8 and the support arm 2 about the first rotation axis A, following the constraints set by the blocking body 31 and the blocking element 11a the transmission organ 5 imparts a rotation of the second body 9 about the second rotation axis B.

The operator operatively blocks the rotation of the support arm 2, by gripping it with a hand, and rotates the first body 8 with the other hand.

In more detail, once the first body 8 has been rotated, the second shaft 5b rotates about the first shaft 5a at the relative conical pair 26, enabling rotation about the first rotation axis A.

At the same time, the rotation of the second shaft 5b, in collaboration with the fact that the rotation of the third shaft 5c about the rotation axis C of the cutting head 3 is blocked, causes the second shaft 5b to draw the third shaft 5c in rotation about the second rotation axis B.

In other words, the constraint introduced by the blocking element 11a makes the third shaft 5c solid to the second shaft 5b, and consequently rotatable with the second shaft 5b about the second rotation axis B.

This mechanism advantageously enables a simultaneous rotation of the cutting head 3 about the first rotation axis A and the second rotation axis B, impressing a single rotation on the first body 8.

Further, in the illustrated embodiment the orientation device 6 comprises a manoeuvring organ 19 solidly constrained to the first body 8 and developing in a nearing direction to the grip portion 2c of the support arm 2.

In still more detail, the manoeuvring organ 19 comprises a sleeve 20.

The sleeve 20 extends to at least partially cover the support arm 2 between a first end 20a, solidly constrained to the first body 8, and a second end 20b, in proximity of the grip portion 2c of the support arm 2.

In other words, the sleeve 20 is coaxial to the support arm 2 and rotates with respect thereto solidly with the first body 8.

During use, an operator acts on the sleeve 20 to impress a rotation to the first body 8.

This advantageously enables the operator to rotate the first body 8 without having to change the handling position, as the sleeve 20 is in proximity to the grip portion 2c of the support arm 2.

Further, the orientation device comprise blocking means 15 of the relative rotation between the first body 8 and the second body 9.

The blocking means 15 are selectively activatable by the operator when the edge-trimmer 1 is in use.

In particular, the blocking means 15 comprise a vice 16 which can be tightened or loosened respectively such as to prevent or enable relative rotation between the first body 8 and the second body 9.

In still more detail, the vice 16 comprises two slots 17 connected to the second body 9 and protruding parallel in a distancing direction therefrom.

Each slot 17 comprises a hole 17a aligned with the hole of the other slot 17.

The vice 16 further comprises a screw 18 engageable with the holes 17a of the slots 17 in order to near or distance them to or from one another such as to tighten or loosen the vice 16.

This advantageously enables having no relative rotation between the first body 8 and the second body 9 during the use of the edge-trimmer 1 with the simple tightening of the screw 18.

Further, the edge-trimmer 1 comprises a blocking vice 28 of the first body 8.

The blocking vice 28 can be tightened or loosened respectively such as to prevent or enable relative rotation between the first body 8 and the support arm 2.

In still more detail, the blocking vice 28 comprises two tabs 29 connected to the first body 8 and protruding parallel distancingly therefrom.

Each tab 29 comprises a respective hole 29a aligned with the hole of the other tab 29.

The blocking vice 28 further comprises a respective screw 30 engageable with the respective holes 29a of the tabs 29 in order to near or distance them to or from one another such as to tighten or loosen the blocking vice 28.

This advantageously enables not having relative rotation between the first body 8 and the support arm 2 during use of the edge-trimmer 1 with the simple tightening of the screw 18.

The use of the blocking means 15 and the blocking vice 28 advantageously enables the operator to rotate the orientation device 6 directly.

This use mode, alternative to the use of the manoeuvring organ 19, is preferred when it is necessary to orientate the cutting head 3, or the rotation axis C thereof in precise and predetermined angular amounts.

Via application between the first and second bodies 8, 9 of appropriate cogged references or graduated scales, not illustrated in the accompanying figures of the drawings, the rotation axis of the cutting head 3 can be orientated by a precise angle with respect to the horizontal plane.

In use, when the orientation of the head has to be modified, the operator turns the motor 4 off and unscrews the screw 30 belonging to the blocking vice 28.

This enables rotation, preferably along predetermined angular sectors, of the first body 8 with respect to the support arm 2 along the first rotation axis A.

In the same way, by unscrewing the screw 18 belonging to the blocking means 15, it will be possible to perform a rotation, preferably along predetermined angular sectors, of the second body 9 with respect to the first body 8 along the second rotation axis B.

Once the desired orientation of the cutting head 3 has been reached, the operator will proceed to tighten the screw 30 in order not to enable any more relative rotations between the first body 8 and the support arm 2, and to lock the screw 18, in order not to enable several relative rotations between the first body 8 and the second body 9.

Figure 5:
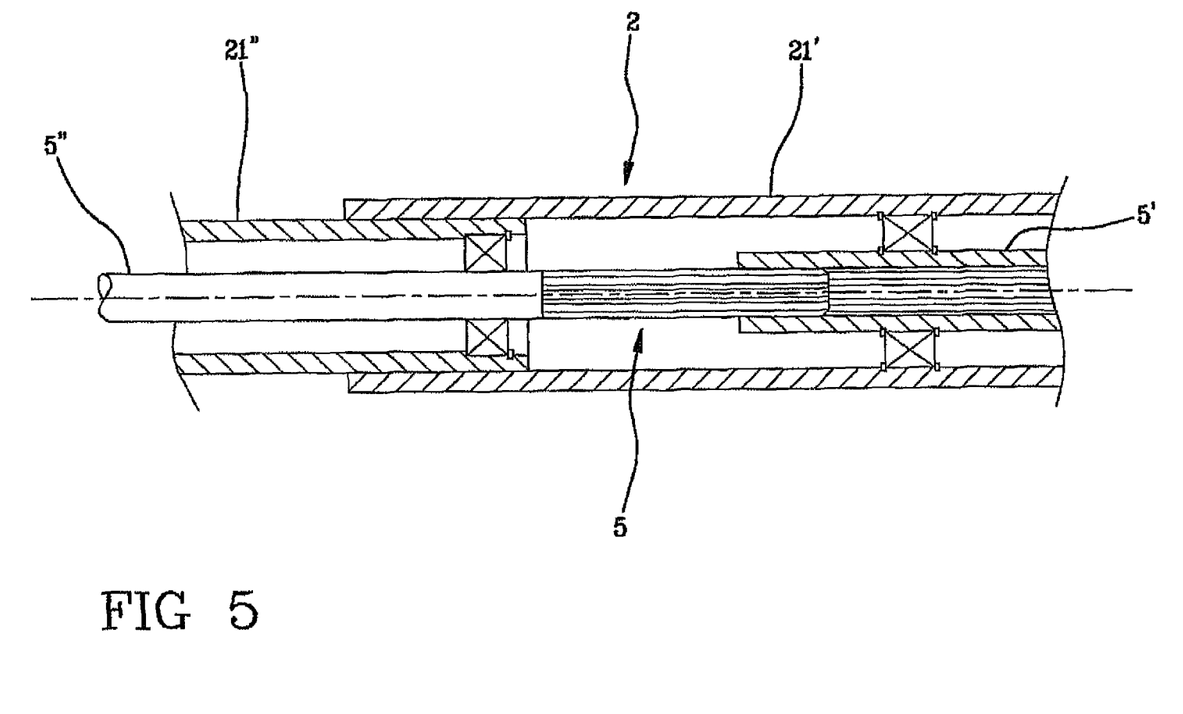
FIG. 5 is a section view of a detail of the edge-trimmer of FIG. 1, in accordance with a variant embodiment.

In an alternative embodiment, illustrated in FIG. 5 the support arm 2 exhibits a telescopic structure.

In other words, the support arm 2 exhibits at least two tubular bodies 21', 21", connected telescopically to one another in order to slide reciprocally such as to vary the overall length of the support arm 2.

In the same way, the first shaft 5 exhibits at least two tubular bodies 5', 5" telescopically connected to one another in order to slide reciprocally such as to vary the overall length of the first shaft 5 in accordance with the length of the support arm 2.

In a further embodiment, not illustrated, the support arm 2 is composed of at least two parts, separate from one another, which enable interposing of a prolongation portion.

In other words, in this embodiment the two parts of the support arm 2 are engageable and disengageable to one another in order to vary the overall length of the support arm 2 between a configuration of maximum length and a configuration of minimum length.

The invention attains the set aims and provides important advantages.

An edge-trimmer of the present invention is simple to use in all use conditions and at any inclination of the cutting plane.

In particular, since the cutting head can rotate about the two rotation axes in order to be orientated, it can assume a number of raised positions, enabling the operator to select which is the most appropriate and according to the work to be performed. In any case, even following the change of orientation of the cutting head the orientation of the support arm can stay the same, guaranteeing an easy and safe grip on the part of the user and a correct positioning of the internal combustion engine.

The special conformation of the edge-trimmer, object of the present invention, enables a high number of cutting head positions to be obtained in different modes: by acting on the blocking means 15 and the blocking vice 28, or by acting on the coupling means 11 and the blocking body 31.

What is more, the transmission of the drive via the rigid transmission organ 5 and the relative conical couplings 26, 27 enables the motor 4 to transmit high power levels to the cutting head 3, which are necessary in professional use of the edge-trimmers.

Further, the presence of a telescopic structure of the support arm enables the operator to adapt the edge-trimmer to various types of use while maintaining the wielding position unaltered.

The invention claimed is:

1. An edge-trimmer comprising:
   a holdable support arm (2) extending along a prevalently longitudinal axis (D);
   a cutting head (3) which is rotatable about a rotation axis (C) thereof, positioned in proximity of an end (2b) of the support arm (2);
   a motor (4);
   a transmission organ (5) for connecting the motor (4) to the cutting head (3);
   an orientation device (6) of the cutting head (3) connected to the support arm (2) and rotatable about a first rotation axis (A); the orientation device (6) further exhibiting a rotatable joint (7) which enables the cutting head (3) to rotate about a second rotation axis (B) which is inclined with respect to the first rotation axis (A); and
   coupling means (11) of the transmission organ (5) to the orientation device (6) which coupling means (11) are selectively activatable such that the transmission organ (5) can yield a rotation of the rotatable joint (7) about the second rotation axis (B).

2. The edge-trimmer of claim 1, characterised in that the orientation device (6) comprises at least a first body (8) associated rotatably about the first rotation axis (A) to the support arm (2) at the end (2b) thereof, and a second body (9) rotatably associated about the second axis (B) to the first body (8) in order to define the rotatable joint (7) and to which the cutting head (3) is connected.

3. The edge-trimmer of claim 2, characterised in that the transmission organ (5) is at least partly internal of the first body (8) and the second body (9); the coupling means (11) comprising a blocking element (11a) for engaging the transmission organ (5) to the second body (9) such as to make the movement of the transmission organ (5) at least partly solid with the rotation of the second body (9).

4. The edge-trimmer of claim 3, characterised in that the first body (8) and the second body (9) are each defined by a respective first tubular portion (8a, 9a) and a respective second tubular portion (8b, 9b) which are inclined with respect to one another and which are unremovably connected.

5. The edge-trimmer of claim 2, characterised in that the support arm (2) and the first body (8) and the second body (9) are connected to one another such as internally to define a conduit (10) which develops in a succession of straight lines (10a, 10b, 10c) arranged respectively along the first rotation axis (A), the second rotation axis (B) and the rotation axis (C) of the cutting head (3).

6. The edge-trimmer of claim 5, characterised in that the transmission organ (5) comprises a plurality of shafts (5a, 5b, 5c) each housed at a respective straight line (10a, 10b, 10c) of the conduit (10); the shafts (5*a*, 5*b*, 5*c*) being rotatably engaged in succession to one another.

7. The edge-trimmer of claim 1, characterised in that the transmission organ (5) is at least partly internal of the support arm (2); the edge-trimmer (1) further comprising a blocking body (31) for engaging the transmission organ (5) with the support arm (2).

8. The edge-trimmer of claim 5, characterised in that the transmission organ (5) is at least partly internal of the support arm (2); the edge-trimmer (1) further comprising a blocking body (31) for engaging the transmission organ (5) with the support arm (2) in order to make the movement of the transmission organ (5) at least partly solid with the support arm (2); further characterised in that the blocking body (31) is a coupling pin between the support arm (2) and a respective shaft (5*a*) for solidly associating movement thereof.

9. The edge-trimmer of claim 2, characterised in that it comprises means (15) for blocking relative rotation between the first body (8) and the second body (9) such as to keep an orientation of the cutting head (3) fixed with respect to the support arm (2).

10. The edge-trimmer of claim 2, characterised in that the orientation device (6) comprises a manoeuvring organ (19) which is rotationally solid to the first body (8) and which develops in a nearing direction to a grip portion (2*c*) of the support arm (2) in order to enable movement by a user of the first body (8) about the first rotation axis (A).

* * * * *

UNITED STATES PATENT AND TRADEMARK OFFICE
CERTIFICATE OF CORRECTION

PATENT NO. : 8,869,405 B2
APPLICATION NO. : 13/395468
DATED : October 28, 2014
INVENTOR(S) : Lelio Codeluppi et al.

Page 1 of 1

It is certified that error appears in the above-identified patent and that said Letters Patent is hereby corrected as shown below:

On the Title Page, at item (73) Assignee, after "S.N.C." and before "Becchi", please insert --Di--.

Signed and Sealed this
Seventeenth Day of February, 2015

Michelle K. Lee
*Deputy Director of the United States Patent and Trademark Office*